Figure 1:
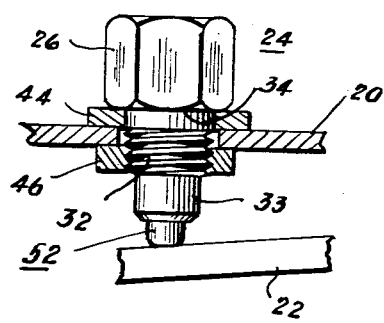

Feb. 4, 1964 E. R. SCHNEIDER 3,120,242
FLOAT ARM OPERATED VALVE
Filed Feb. 23, 1961

INVENTOR.
EDGAR R. SCHNEIDER
BY Rey Eilers
ATT'Y.

United States Patent Office 3,120,242
Patented Feb. 4, 1964

3,120,242
FLOAT ARM OPERATED VALVE
Edgar R. Schneider, St. Louis, Mo., assignor to Fuel Controls Corporation, Manchester, Mo., a corporation of Missouri
Filed Feb. 23, 1961, Ser. No. 91,051
1 Claim. (Cl. 137—437)

This invention relates to improvements in fuel-handling devices. More particularly, this invention relates to improvements in valves for the float chambers of carburetors.

It is therefore an object of the present invention to provide an improved valve for the float chamber of a carburetor.

In a carburetor which has a float chamber, one of the most critical and important calibrations is the calibration of the fuel level in that float chamber. That fuel level determines the normal level of the fuel in the jet in the venturi passage of the carburetor; and if that fuel level is too high, the fuel-air mixture provided by the carburetor will be unduly rich. Such a mixture will lead to needless fuel consumption and thus to undesirable reductions in the efficiency of the engine with which the carburetor is associated. On the other hand, if the fuel level in that float chamber is too low, the fuel-air mixture provided by the carburetor will be too lean. Consequently, it is important to set and maintain the fuel level in the float chamber of a carburetor at the desired level.

At the present time, most of the commercially-available carburetors utilize tapered needle valves to regulate the entry of the fuel into the float chambers thereof; and the floats in those float chambers normally hold those needle valves against those seats. As long as the conical faces of those needle valves remain perfectly smooth, the levels of the fuel in those float chambers can be held at the desired levels. However, the pulsations which the fuel pumps apply to the fuel entering the float chambers of the carburetors cause the floats in those float chambers to "bounce" the conical faces of the needle valves against the valve seats; and, within relatively short periods of time, grooves begin to form in the conical faces of those needle valves. Those grooves make it necessary for the floats to rise up further to make sure that those needle valves fully engage the valve seats, and hence those grooves lead to the raising of the fuel levels in the float chambers. As a result, most engines which use float-type carburetors provide less efficient operation after they have been used than they do when they are new. The present invention avoids any grooving of the valve element which controls the entry of fuel into the float chamber of a carburetor; and it thereby keeps the level of the fuel in that float chamber at the desired level. It is therefore an object of the present invention to provide a valve which controls the entry of fuel into the float chamber of a carburetor and which has a valve element that remains free of grooving.

The present invention uses a ball as the valve element which controls the entry of fuel into the float chamber; and that ball is loosely held in proximity to the valve seat by a guide which will permit that ball to move both vertically and horizontally, and thus permit that ball to align itself with that valve seat as that ball is moved toward that seat. In this way, that guide permits the ball to move squarely into sealing engagement with the valve seat with a minimum of wear and with a minimum of resistance. Further, the fact that the ball can move both vertically and horizontally enables that ball to rotate and present different portions of the surface thereof to the valve seat. The overall result is that the ball will remain ungrooved and will thus be able to maintain the level of the fuel in the float chamber at the desired level. It is therefore an object of the present invention to provide a ball as the valve element which controls the entry of fuel into the float chamber of a carburetor and to confine that ball loosely within a guide.

By eliminating grooving of the valve element, the present invention not only keeps the level of the fuel in the float chamber of the carburetor at the desired level, but it also prevents sticking of that valve element due to grooving. Such sticking is objectionable because it can, and has been known to, prevent starting of the engine. Where a valve elements sticks because of the grooving thereof, a mechanic must first recognize that the grooving of the valve element caused that valve element to stick and must then take a hammer or other hard object and deliver a sharp blow to the float chamber of the carburetor to free that valve element. All of this is time-consuming and expensive, and it does not keep that valve element from again sticking at a later date. Further, if the engine of an automobile were to die on a crowded highway, and if a stuck needle valve were to prevent the re-starting of that engine, there would be a serious personal risk in getting out of that automobile to try to free that stuck valve. The present invention obviates these problems by using a loosely-held ball as the valve element; because such a ball will not become grooved and will not stick.

The ball of the valve provided by the present invention is additionally kept from sticking because the guide for that ball moves with that ball. As a result, any tendency of the ball to adhere to the guide will tend to cause the ball to move toward valve-opening position rather than to remain in valve-closing position. It is therefore an object of the present invention to provide a ball as the valve element which controls the entry of fuel into the float chamber of a carburetor and to use a movable guide to loosely hold that ball in general alignment with the valve seat.

The use of a ball as the valve element which controls the entry of fuel into the float chamber of a carburetor is additionally desirable because it facilitates rapid opening of the valve. This means that there will be less turbulence of the fuel in the float chamber because the float will not have to dip as far to open the valve. Furthermore, the use of a ball as the valve element which controls the entry of fuel into the float chamber of a carburetor can, if desired, permit the use of a larger inlet orifice for the float chamber.

The guide for the ball provided by the present invention can yieldably urge that ball into engagement with the valve seat. Yielding engagement between that ball and that valve seat is helpful because it prolongs the life of the ball and also prolongs the life of the valve seat. Furthermore, that yielding engagement readily enables the ball to move squarely into alignment with the valve seat as that ball is moved into sealing engagement with that valve seat. In addition, that yielding action obviates the abruptness with which prior valve elements shut off the flow of incoming fuel. It is, therefore, an object of the present invention to provide a guide for the ball of a fuel-handling valve which has a resilient member to urge the ball toward the seat of that valve.

The yieldable engagement of the ball and valve seat, which is provided by the present invention, is additionally desirable because it keeps the valve from opening in the event a transient change occurs in the level of the fuel in the float chamber. Specifically, if a carburetor is used with the engine of a vehicle which is driven around a corner at high speed, the float may tend to drop momentarily as the fuel responds to centrifugal force and shifts toward one side of the float chamber. It would be undesirable for the valve to open in such an event; because, if it did open, the level of the fuel would be higher than desired when the vehicle resumed straight-line movement and the fuel in the float chamber leveled itself. The yieldable engagement between the ball and valve seat, provided by the present invention, makes it possible for the float to drop momentarily while the ball remains in valve-closing position. Then, when the float returns to its raised position, the level of the fuel within that float chamber will not be unduly high. The yielding engagement between the ball and the valve seat similarly keeps the tilting of an engine, mounted on rubber blocks for "floating power" operation, from causing fuel level in the float chamber to rise unduly. In addition, that yielding engagement keeps the bouncing of an engine, mounted on a vehicle, from causing the fuel level in the float chamber to rise unduly as that vehicle hits "chuck holes" in the road.

The yieldable engagement between the ball and the valve seat, provided by the present invention, is additionally advantageous because it tends to smooth out the pulsations which are applied to the fuel by the fuel pump. As the float tends to rise up and move the ball into engagement with the valve seat, the resilient member which provides the yielding engagement between the ball and the valve seat will become compressed. As that float later moves down to let the ball move away from the valve seat, that resilient member will tend to return to its normal, unstressed condition. This compression and restoration smooths out the movement of the ball into and out of engagement with the valve seat, and thereby smooths out the pulsations which the fuel pump applies to the fuel.

Other and further objects and advantages of the present invention should become apparent from an examination of the drawing and accompanying description.

In the drawing and accompanying description three preferred embodiments of the present invention have been shown and described, but it is to be understood that the drawing and accompanying description are for the purpose of illustration only and do not limit the invention and that the invention will be defined by the appended claim.

Figure 2:
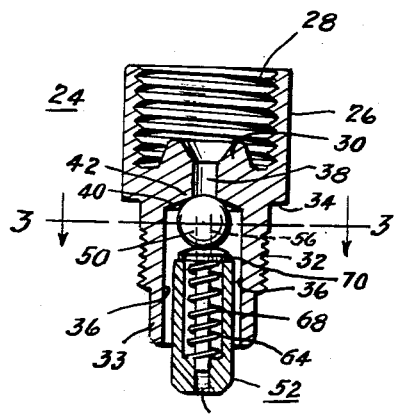
Figure 3:
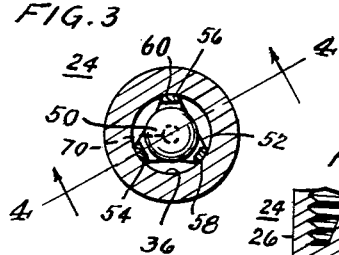
Figure 4:
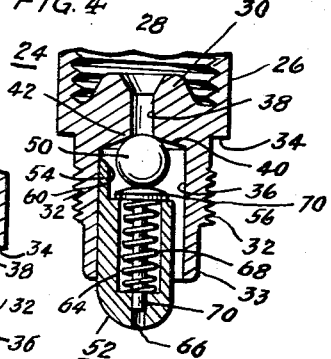
Figures 5, 6:
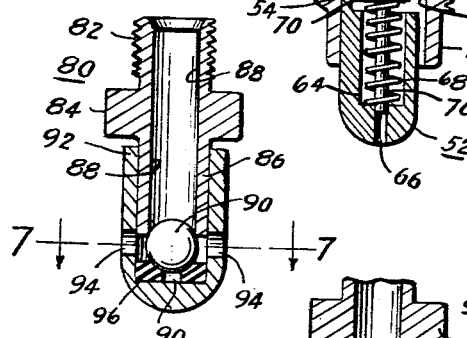
Figure 9:
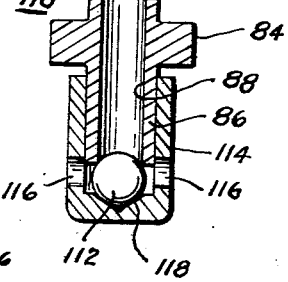
Figure 7:
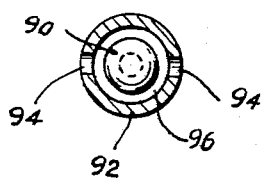
Figure 8:
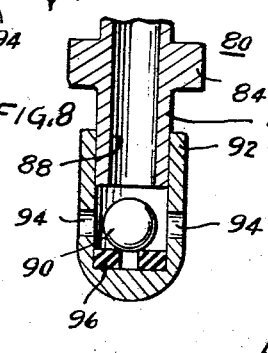

In the drawing,

FIG. 1 is a partially-sectioned, elevational view showing the housing for one embodiment of fuel-handling valve that is made in accordance with the principles and teachings of the present invention, FIG. 2 is a vertical section, on a larger scale, through the valve housing of FIG. 1, FIG. 3 is a sectional view in plan, on the scale of FIG. 2, through the valve housing of FIGS. 1 and 2, and it is taken along the plane indicated by the line 3—3 in FIG. 2, FIG. 4 is a partially-broken, sectional view on the scale of FIG. 2, through the valve housing of FIGS. 1 and 2, and it is taken along the plane indicated by the line 4—4 in FIG. 3, FIG. 5 is a partially-broken, sectional view that is similar to that of FIG. 4, but it shows the ball in valve-opening position, FIG. 6 is a vertical section through a second embodiment of valve that is made in accordance with the principles and teachings of the present invention, FIG. 7 is a sectional view through the valve of FIG. 6, and it is taken along the plane indicated by the line 7—7 in FIG. 6, FIG. 8 is a sectional view that is similar to that of FIG. 6, but it shows the ball in valve-opening position, and FIG. 9 is a partially-broken vertical section through a third embodiment of valve that is made in accordance with the principles and teachings of the present invention.

Referring to the drawing, in detail, the numeral 20 denotes part of the cover of the float chamber of a carburetor. That carburetor can be of standard and usual design, and that carburetor is not, per se, a part of the present invention.

The numeral 22 denotes a part of a lever which is operated by the float within the float chamber of the carburetor. That lever will move up and down in response to rises and falls in the level of the fuel within that float chamber.

The numeral 24 generally denotes a valve housing for one embodiment of fuel-handling valve that is made in accordance with the principles and teachings of the present invention. That valve housing has a polygonal, wrench-receiving portion 26 at the upper end thereof; and that wrench-receiving portion is hollow and has an internal thread 28. An upstanding annulus 30 is provided within the hollow, wrench-receiving portion 26, and that annulus can suitably accommodate a flare on a section of tubing which is connected to the outlet of the fuel pump of the engine with which the carburetor is associated. A suitable, threaded fitting will surround that tubing and will mate with the internal thread 28.

The valve housing 24 has a generally-cylindrical lower portion which has a thread 32 thereon. That cylindrical portion also has a bottom section 33 of reduced diameter. A shoulder 34 is provided intermediate the lower cylindrical portion and the upper wrench-receiving portion of the valve housing 24. A cylindrical recess 36 is provided in the lower cylindrical portion of the valve housing 24, and a passage 38 of reduced diameter connects the recess 36 with the hollow wrench-receiving portion 26 of that valve housing. A frusto-conical surface 40 constitutes the upper end of the recess 36, and that frusto-conical surface coacts with the passage 38 to define an annular seat 42. The lower cylindrical portion of the valve housing 24 can be telescoped through a washer 44 and can then be passed downwardly through an opening in the cover 20 of the float chamber. A nut 46 can be placed in engagement with the thread 32 and used to hold the valve housing 24 fixed relative to the cover 20.

The numeral 50 denotes a ball which can engage the seat 42 to prevent the entry of fuel into the recess 36. However, that ball can move downwardly and away from the seat 42 to permit movement of fuel from the passage 38 into the recess 36. A guide 52 is provided for the ball 50; and that guide is prismatic and has a triangular cross-section, as shown particularly by FIG. 3. Three fingers 54, 56 and 58 are provided at the upper end of the guide 52, and those fingers are spaced apart equal distances. Each of those fingers has a reduced-thickness, tapered upper end 60; and those tapered upper ends guide the ball 50 into the space defined by those fingers. The fingers 54, 56 and 58 are spaced far enough apart so they can not simultaneously engage the ball 50. As a result, the ball 50 is free to move vertically and horizontally relative to the fingers 54, 56 and 58 of the guide 52.

The guide 52 has a recess 64 therein; and a reduced-diameter passage 66 extends from the lower end of that recess to the bottom face of that guide. A helical compression spring 68 is telescoped within the recess 64, and the upper end of that spring projects a short distance above the top of that recess, as shown particularly by FIG. 5. That upper end of that spring underlies the head of a pin 70. The shank of that pin extends downwardly through the helical compression spring 68 and extends into the passage 66 in the bottom of the guide 52. The upper face of the head of the pin 70 is generally-spherical, and it underlies and can support the ball 50. The spherical surface of the ball 50 will coact with the generally-spherical surface of the upper face of the pin 70 to minimize the frictional engagement between that ball and that pin. The diameter of the head of the pin 70 is small enough so the periphery of that head will not engage the fingers 54, 56 and 58. As a result, the pin 70 can move freely between the position shown by FIGS. 2 and 4 and the position shown by FIG. 5. The springs 68 will bias the pin 70 to the position shown by FIG. 5 but can yield to permit that pin to move into the position shown by FIGS. 2 and 4

Whenever the lever 22 is in the raised position shown by FIG. 1, it will abut the bottom face of the guide 52 and force that guide upwardly into the position shown by FIGS. 2 and 4. At such time, the spring 68 will be compressed to enable the portions of the guide 52 intermediate the fingers 54, 56 and 58 to engage the pin 70 and cause that pin to force the ball 50 up into sealing engagement with the seat 42 at the upper end of the recess 36. Also at such time, that ball will coact with that seat to prevent the movement of further fuel from the passage 38 into the recess 36. However, when the lever 22 moves downwardly, in response to lowering of the level of the fuel in the float chamber, the guide 52 will move downwardly and will permit the ball 50 to move downwardly in response to the pressure on the fuel above that ball. That fuel will then flow downwardly on all sides of the ball 50 and flow downwardly intermediate the three flat sides of the guide 52 and the cylindrical inner face of the recess 36. As the guide 52 and the ball 50 move downwardly, the spring 68 will return to its unstressed condition; but the resulting vertical expansion of the spring 68 will be limited, as indicated particularly by FIG. 5.

As the fuel which flows from the passage 38 into the recess 36, and thence into the float chamber, causes the fuel level in that float chamber to rise, the float will once again raise the lever 22 and force the guide 52 to move upwardly. As that guide moves upwardly, the inner faces of the fingers 54, 56 and 58 thereof will hold the ball 50 in general registry with the seat 42 but will permit that ball to move laterally relative to that seat. As the ball 50 approaches the seat 42, the pin 70 will respond to the forces which the in-coming fuel apply to that ball to cause the spring 68 to yield slightly. As the lever 22 continues to move upwardly, the spring 68 will be compressed even further; and the portions of the guide 52 intermediate the fingers 54, 56 and 58 will engage that ball and will move that ball into sealing engagement with the seat 42. The yieldability of the spring 68 will enable the ball 50 to move gently as it moves into engagement with the seat 42; and that yieldability will thus minimize the wearing of that seat. Also, that yieldability will help smooth out the pulsations which the fuel pump applies to the fuel. As the spring 68 forces the ball 50 toward the seat 42, the frusto-conical upper end of the recess 36 will guide that ball toward that seat.

Referring to FIGS. 6-8, the numeral 80 generally denotes the valve housing of another embodiment of fuel-handling valve that is made in accordance with the principles and teachings of the present invention. That valve housing has a cylindrical upper portion which has an external thread 82. A radially-projecting shoulder 84 is formed on the housing 80 below the level of the lower end of the thread 82, and a tubular portion 86 extends downwardly from that shoulder. The cylindrical upper portion can telescope upwardly through an opening in the cover of the float chamber of a carburetor; and thereafter a nut can be threaded onto the thread 82 and can be tightened to secure the valve housing 80 to the cover of the float chamber.

The tubular portion 86, the radially projecting shoulder 84, and the cylindrical upper portion have a passage 88 passing through them. That passage will communicate with a suitable length of tubing which is secured to the cylindrical upper portion of the valve housing and which is connected to the fuel pump of the engine with which the carburetor is associated.

The numeral 90 denotes a ball which can engage the lower end of the tubular portion 86 of the valve housing and thereby prevent the entry of fuel into the float chamber. That ball is loosely held within a guide 92 in the form of a sleeve that has the lower end thereof closed. That sleeve telescopes upwardly over the tubular portion 86 of the valve housing 80 and will be guided by that tubular portion. Sufficient clearance will be provided between the exterior of the tubular portion 86 and the interior of the guide 92 to permit ready reciprocation of that guide relative to that tubular portion. The guide 92 has two ports 94 therein, and the axes of those ports are perpendicular to the geometric axis of the guide 92. Those ports are located below the level of the seat at the bottom of the tubular portion 86.

A washer 96 of resilient material, such as synthetic rubber or the like, is disposed within the guide 92 adjacent the closed end of that guide. That washer underlies the ball 90 and performs the dual function of tending to center that ball within the guide and of yielding as that ball moves into engagement with the lower end of the tubular member 86. In so yielding, the resilient washer 96 performs a function which is similar to that of the helical compression spring 68 in FIGS. 1-5.

The lower end of the guide 92 will rest upon, and be supported by, a lever which is connected to the float in a float chamber. As that float rises, it will cause that lever to raise that guide and thereby cause the ball to approach the lower end of the tubular portion 86. The washer 96 will hold that ball in general registry with that lower end; and as that ball moves into engagement with that lower end, that lower end will fully center that ball. As the ball 90 closely approaches fully-closed position, the washer 96 will yield to cushion the engagement of that ball with the lower end of the tubular portion 86.

Referring to FIG. 9, the numeral 110 denotes the valve housing of a third embodiment of fuel-handling valve that is made in accordance with the principles and teachings of the present invention. That valve housing is identical to the valve housing 80 in FIGS. 6-8; having a radially-projecting shoulder 84 and a downwardly-extending tubular portion 86. A passage 88 extends through the body of the valve housing 110, and that passage will be suitably connected to the fuel pump of an engine. The tubular portion 86 of the valve housing 110 will extend downwardly into the float chamber of a carburetor.

The numeral 112 denotes a ball which can engage the lower end of the tubular portion 86 of the valve housing 110 and thereby prevent the entry of fuel into the float chamber. That ball is loosely held within a guide 114 in the form of a sleeve that has the lower end thereof closed. That sleeve telescopes upwardly over the tubular portion 86 of the valve housing 110 and will be guided by that tubular portion. Sufficient clearance will be provided between the exterior of the tubular portion 86 and the interior of the guide 114 to permit ready reciprocation of that guide relative to that tubular portion. The guide 114 has two ports 116 therein, and the axes of those ports are perpendicular to the geometric axis of the guide 114. Those ports are located below the level of the seat at the bottom of the tubular portion 86 of the valve housing 110.

A conical recess 118 is provided at the interior of the closed bottom of the guide 114; and the ball 112 will rest in that recess whenever the guide 114 is moved downwardly. That recess will center that ball relative to the passage 88, and thereby facilitate prompt and full seating of that ball against the lower end of that passage when the guide 114 is moved toward valve-closing position.

The lower end of the guide 114 will rest upon, and be supported by, a lever which is connected to the float in a float chamber. As that float rises, it will cause that lever to raise that guide and thereby cause the ball to approach the lower end of the tubular portion 86. The recess 118 will hold that ball in general registry with that lower end; and as that ball moves into engagement with that lower end, that lower end will fully center that ball. When the float is in its fully-raised position, the guide 114 will hold the ball 112 solidly in valve-closing position.

It will be noted that the balls 50, 90 and 112 are loosely supported by guides that move with those balls during the valve-opening movement. As a result, any tendency of those balls to stick to those guides will facilitate the movement of those balls to valve-opening position, and will virtually eliminate any tendency of those balls to stick in valve-closing position. It will also be noted that the balls 50, 90 and 112 are free to move laterally relative to the guides. This is desirable because it enables those balls to readily align themselves with the valve seats with which they must move into sealing engagement. Further, it will be noted that the balls 50 and 90 are resiliently urged into sealing engagement with the valve seats. As a result, wearing of those balls and of those seats is minimized, and the pulsations on the fuel entering the float chamber are minimized. Also, the guides can move downwardly short distances while still permitting the balls to remain in engagement with the valve seats.

It will be noted that with the valves of FIGS. 6-8 and 9, the fuel is caused to change direction and to start moving horizontally before it leaves the guides. This is desirable because it holds to a minimum the turbulence resulting from the introduction of the fuel into the float chamber.

The loose engagement between the balls 50, 90 and 112 and the guides therefor is desirable because it enables those balls to rotate freely relative to those guides. Such rotation obviates grooving of the balls, keeps specks of dirt from locking the balls against rotation, and facilitates ready and continuous cleansing of those balls.

Whereas the drawing and accompanying description have shown and described three preferred embodiments of the present invention, it should be apparent to those skilled in the art that various changes may be made in the form of the invention without affecting the scope thereof.

What I claim is:

A fuel-handling valve for a carburetor comprising a valve housing having a vertical tubular portion the lower end of which forms a valve seat, a guide that surrounds and slides on said tubular portion for movement toward and away from said seat, said guide having a lower closed end and a resilient washer disposed at the upper face of said closed end, said guide having a port in the side wall thereof above said closed end and said washer, a ball loosely fitting within said guide and normally resting on said washer and being selectively movable into and out of engagement with said valve seat upon vertical movement of said guide, and float operated lever means for raising said guide to press said ball against said valve seat and thereby shut off the flow of fluid.

References Cited in the file of this patent

UNITED STATES PATENTS

| | | |
|---|---|---|
| 963,842 | Williams | July 12, 1910 |
| 1,223,170 | Hodgson | Apr. 17, 1917 |
| 1,980,144 | Siena | Nov. 6, 1934 |
| 2,281,126 | Willits | Apr. 28, 1942 |
| 2,439,282 | Beckett | Apr. 6, 1948 |
| 2,749,895 | Flint | June 12, 1956 |
| 2,752,937 | Hieger | July 3, 1956 |
| 2,916,045 | Auch | Dec. 8, 1959 |
| 2,933,103 | Campbell | Apr. 19, 1960 |

FOREIGN PATENTS

| | | |
|---|---|---|
| 18,150 | Australia | Jan. 30, 1930 |
| 550,298 | Italy | Oct. 23, 1956 |